(12) United States Patent
Ye et al.

(10) Patent No.: US 10,680,945 B1
(45) Date of Patent: Jun. 9, 2020

(54) EXTENDING OVERLAY NETWORKS TO EDGE ROUTERS OF A SUBSTRATE NETWORK

(71) Applicant: Amazon Technologies, Inc., Seattle, WA (US)

(72) Inventors: Shuai Ye, Herndon, VA (US); Joseph Elmar Magerramov, Bellevue, WA (US); Mohamed Nader Farahat Hassan, Issaquah, WA (US); Aarthi Raju, Newark, CA (US); Haider Witwit, Chantilly, VA (US)

(73) Assignee: Amazon Technologies, Inc., Seattle, WA (US)

( * ) Notice: Subject to any disclaimer, the term of this patent is extended or adjusted under 35 U.S.C. 154(b) by 70 days.

(21) Appl. No.: 16/145,102

(22) Filed: Sep. 27, 2018

(51) Int. Cl.
| | |
|---|---|
| *H04L 12/715* | (2013.01) |
| *H04L 12/741* | (2013.01) |
| *G06F 9/455* | (2018.01) |
| *H04L 12/46* | (2006.01) |

(52) U.S. Cl.
CPC .......... *H04L 45/64* (2013.01); *G06F 9/45558* (2013.01); *H04L 12/4641* (2013.01); *H04L 45/04* (2013.01); *H04L 45/745* (2013.01); *G06F 2009/45595* (2013.01)

(58) Field of Classification Search
CPC ... H04L 45/64; H04L 12/4641; H04L 45/745; H04L 45/04; G06F 9/45558; G06F 2009/45595
See application file for complete search history.

(56) References Cited

U.S. PATENT DOCUMENTS

| | | | |
|---|---|---|---|
| 7,095,740 B1 | 8/2006 | Jagannath et al. | |
| 7,185,107 B1 | 12/2007 | Cassar | |
| 8,239,572 B1 * | 8/2012 | Brandwine | G06F 9/45558 370/258 |
| 9,692,713 B2 | 6/2017 | Saavedra | |
| 9,916,545 B1 | 3/2018 | de Kadt et al. | |
| 2005/0193103 A1 | 9/2005 | Drabik | |
| 2007/0239987 A1 | 10/2007 | Hoole et al. | |
| 2008/0034200 A1 | 2/2008 | Polcha et al. | |
| 2008/0225875 A1 | 9/2008 | Wray et al. | |
| 2009/0288084 A1 | 11/2009 | Astete et al. | |
| 2011/0022694 A1 | 1/2011 | Dalal et al. | |
| 2015/0163158 A1 * | 6/2015 | Ryland | H04L 47/70 709/225 |
| 2017/0083354 A1 * | 3/2017 | Thomas | G06F 9/455 |
| 2017/0185437 A1 * | 6/2017 | Thomas | G06F 9/45558 |

FOREIGN PATENT DOCUMENTS

| | | |
|---|---|---|
| CN | 102598591 | 7/2012 |
| EP | 1713231 | 10/2006 |

* cited by examiner

*Primary Examiner* — Walter J Divito
(74) *Attorney, Agent, or Firm* — Robert C. Kowert; Kowert, Hood, Munyon, Rankin & Goetzel, P.C.

(57) ABSTRACT

An overlay network can be extended to edge routers for a substrate network. A request to make an overlay network available may be received at a network manager for a substrate network. The network manager may update an edge router to add an overlay network route to the edge router. The edge router can then indicate that the network route is available for handling network traffic. When network traffic directed to the overlay network is received at the network route, the edge router can forward the network traffic to the overlay network according to the added network route.

20 Claims, 8 Drawing Sheets

EXTENDING OVERLAY NETWORKS TO EDGE ROUTERS OF A SUBSTRATE NETWORK

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each virtual machine being a software simulation acting as a distinct logical computing system that provides users with the illusion that they are the sole operators and administrators of a given hardware computing resource, which also provides application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies have given rise to provider networks, which offer various services or resources to customers via network connections. As the amount of data, transactions, and other interactions with provider networks increase, so too do the various connection requirements for customers of provider networks. Some customers may wish to take advantage of specifying how network traffic is to be handled within provider networks using overlay networks. Making resources hosted within overlay networks more accessible with greater performance and less costs is thus highly desirable.

Figure 1:
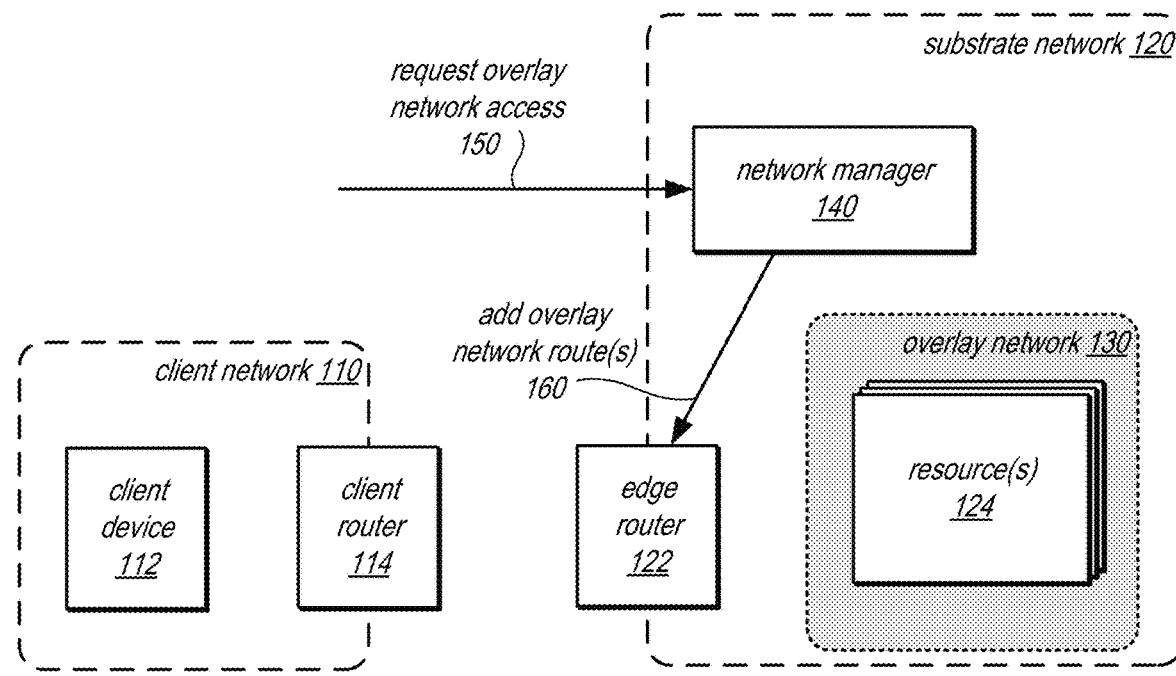
FIG. 1 is a logical block diagram of extending an overlay network to edge routers of a substrate network, according to some embodiments.
Figure 1:
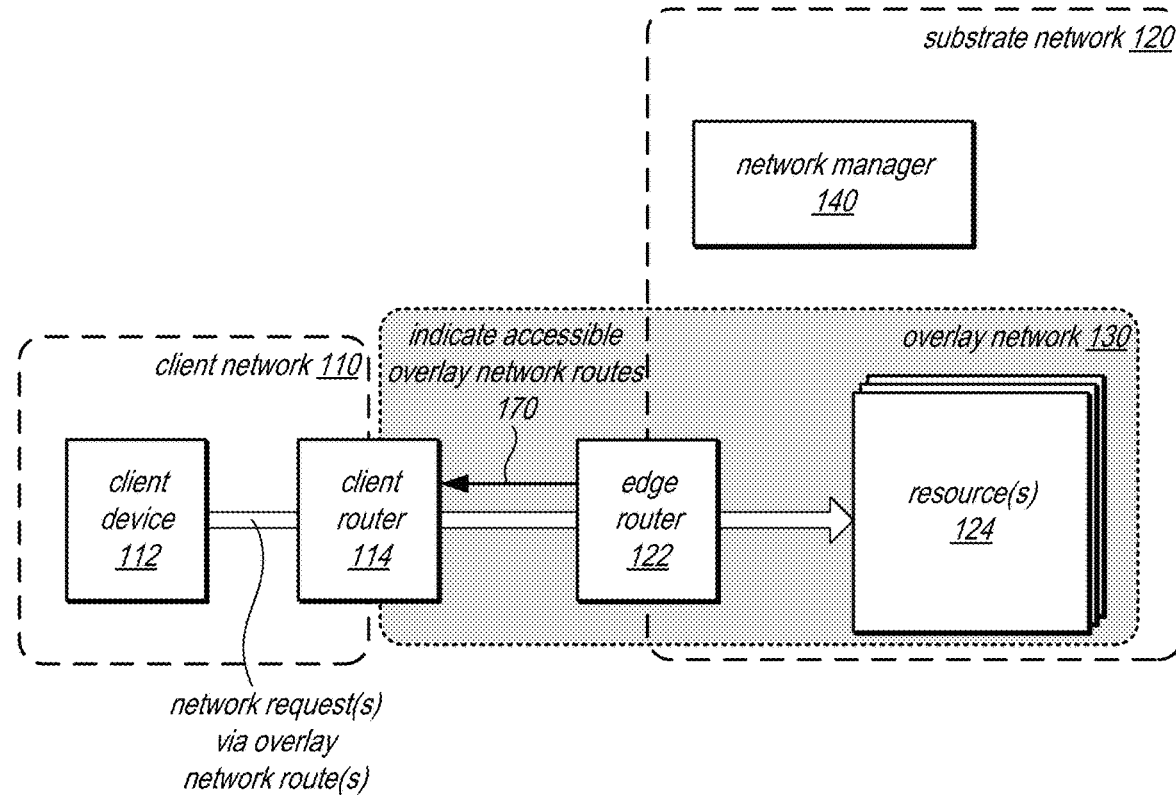

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement extending an overlay network to edge routers of a substrate network, according to some embodiments. A provider network, system, or service may implement a network to allow clients, operators, users, or other customers to use, access, operate, or otherwise control one or more computing resources hosted within the network. These resources may include various types of computing systems or devices that can communicate over the network in order to perform various tasks, operations, or services on behalf of the clients. For example, in some embodiments, a provider network may provide virtual computing resources to clients, users, or other type of customers, in the form of reserved compute instances (e.g., a virtual machine acting as a distinct logical computing system that provides users with the illusion that they are the sole operators and administrators of a given hardware computing resource). Customers of the provider network may reserve (i.e., purchase or buy) one or more compute resources (such as compute instances) or utilize other resources to perform various functions, services, techniques, and/or applications.

A provider network may include several large data centers hosting various resource pools, such as collections of physical and/or virtualized computer servers, storage devices, networking equipment and the like, needed to implement, configure and distribute the infrastructure and services offered by the provider, in some embodiments. In order to extend the geographical areas over which its services can be accessed with desired levels of performance, reliability and security, an operator of a provider network may establish private or dedicated network paths between its data centers and one or more routers that may be physically located at an external facility. The facilities at which these routers may be housed are sometimes referred to as "router co-location facilities", as they may sometimes house routers and other network equipment owned and/or managed by business entities other than the provider network's operator. In at least some embodiments, a co-location facility may include a router belonging to or managed by the provider network operator, linked by a dedicated physical connection to another router belonging to or owned by an entity (i.e. a customer of the provider network) operating a client network that is external to the provider network. In this way various systems, components, and/or devices implemented within the client network may utilize the dedicated physical connection for traffic between provider network resources assigned to the customer (such as compute instances, storage service nodes and the like) and external resources located outside the provider network.

A provider network may offer other types of connections or pathways for utilizing resources hosted in the provider network. A wide area network (WAN), such as the Internet, or other public network may be allow client devices to access computing resources via a public network gateway (e.g., unencrypted communications between a client device and the provider network or various secure or encrypted communications to offer private communications over the public network utilizing technologies like Virtual Private Networks (VPNs)), in some embodiments.

A provider network may offer client, customer, account, user, operator, or other entity-specific security features, in various embodiments. For example, a logically isolated network (which may also be referred to in some environments as a virtual private cloud or VPC) may include a collection of computing and/or other resources in a logically isolated section of the provider network, over which the entity using the logically isolated network is granted substantial control with respect to networking configuration. In some embodiments, for example, a customer may select the network address ranges (e.g., Internet Protocol (IP) address ranges or blocks via Classless Inter-Domain Routing (CIDR) notation) to be used for the logically isolated network resources, manage the creation of overlay networks, such as subnets within the logically isolated network, and the configuration of route tables, gateways, etc. for the logically isolated network.

Overlay networks, whether implemented over a logically isolated network, or other substrate networks may offer clients, operators, customers, or other users of resources hosted in the substrate network greater control to route network traffic among resources hosted within the overlay network. For example, overlay networks may allow for the different types of network traffic to be diverted to different resources within the overlay network in order to meet quality of service or other performance goals without requiring changes to the operation of substrate networks over or upon which the overlay network is implemented, in some embodiments.

Because overlay networks may be implemented over a substrate network like logically isolated networks in provider networks, or other systems/services that host resources in networks separate from client devices and networks, the network addresses of overlay networks may not be visible or accessible outside the provider network. In order to enable connectivity between an overlay network and client devices (e.g., in a client network such as client devices that are "on-premise," like customer-owned and operated data center or office premises) private connections could be established.

For example, a virtual connection could be configured for use with private addresses (and therefore may be a private virtual connection) and a virtual private gateway may be set up. A customer-side gateway (e.g., for traffic directed to or from a client device in an external network) may also be set up, then using the customer-side gateway, virtual gateway and connection between, a client device in an on-premise network could utilize the overlay network to communicate from the client device to resources in the overlay network. Such virtual connections could include VPNs implemented between the substrate network and external client network (such as the customer's office network or the customer's data centers). In these implementations, VPNs may be simple secure networking protocols such as IPSec (Internet Protocol Security), SSL/TLS (Secure Sockets Layer/Transport Layer Security), DTLS (Datagram Transport Layer Security) and the like. Resorting to virtualized private communications in order to access an overlay network as discussed above provide sub-optimal performance for client devices utilizing an overlay network from an on-premise network. For instance, utilizing virtualized private connections may reduce the bandwidth and performance of communications between client devices and the overlay network, as well as greatly increase the management costs to maintain the virtualized connections (e.g., as VPN servers or other virtualized private network resources may have to be implemented and maintained).

Extending an overlay network to edge routers of a substrate network may, as described in various embodiments, increase the performance of communications between client devices and the overlay network. For instance, as the edge routers of the substrate network may be used to route requests according to overlay network routes instead of using virtualized private communications that involve additional network devices (e.g., VPN servers), significant bandwidth increases (e.g., 10× increase in bandwidth) may be achieved. Similarly, the costs of facilitating communications via virtualized private communications may be removed (e.g., the costs to host, operate, utilize, procure VPN servers to maintain private communication links to resources in the overlay network).

FIG. 1 is a logical block diagram of extending an overlay network to edge routers of a substrate network, according to some embodiments. In scene 102, a substrate network 120 may implement, host, or otherwise provide access to one or more computing resource(s) 124. Client devices, such as client device 112, may utilize resource(s) 124 to perform various tasks (e.g., web-server backend for software applications, databases or data storage systems, ETL or other data processing resources, among others). In order to direct network traffic from client device 112 in a desirable fashion among resource(s) 124, overlay network 130 may be specified by one or more control requests or commands to a network manager 140. For instance, as discussed below with regard FIGS. 3-5, overlay network 130 could be a subnet that is block or range of network addresses, for which one or more network routes can be specified (e.g., request type A may be sent to resource A in overlay network 130 according to an overlay network address, request type B may be sent to resource B in overlay network 130 according to a different overlay network address, and so on).

Network manager 140 may be implemented to manage overlay networks, such as overlay network 130 in substrate network 140, in some embodiments. For example, a sub-network (subnet), route table, and/or other features of overlay network 130 may be created and enforced in response to control requests to network manager 140 to create or modify overlay network 130. In some embodiments, network manager 140 may manage substrate network 120 in addition to overlay network 130. For example, substrate network 120 may be a logically isolated portion of a provider network or other system/service that hosts resources 124, which may be specified according to one or more control requests sent to network manager 140 (e.g., specifying a CIDR block of IP addresses or other information for identifying which portion of the provider network is to be in the substrate network 120. In at least some embodiments, substrate network 120 may not be the only network layer or substrate network over which overlay network 130 is implemented. Consider the example where substrate network 120 is a logically isolated network. The logically isolated network may itself be an overlay network on top of an underlying network of the provider network that is private or not visible to client devices and/or manageable by provider network devices.

A request for direct overlay network access 150 for a client device may be received at network manager 140. The request may specify, for example, a network route in the overlay network (e.g., as part of a route table as discussed below with regard to FIGS. 3-5) to be made accessible. Network manager 140 may update an edge router 122 of substrate network 160 to add the overlay network route(s), in some embodiments. In this way, network traffic directed to the overlay network may not be dropped (or otherwise processed as unknown traffic) at edge router 122. For example, the network route may be added as a default route so that when the edge router fails to identify a match in a lookup table for network traffic directed to the overlay network, the default route may direct the traffic to be forwarded to the appropriate next location according to the overlay network, which can then interpret the overlay network.

As illustrated in scene 104, edge router 122 may send an indication 170 of the accessible overlay network routes to client router 114 of a client network 110 (e.g., which may be an on-premise network of one or multiple resources, like client device 112 and network devices, like client router 114 that implement various client systems, operations, or services). Router advertising protocols, such as border gateway protocol (BGP), among others, may be utilized in some embodiments to indicate the overlay routes. Once indicated, client device 112 may send network requests 180 via the overlay routes in order to reach resources 124 in overlay network 130.

Edge router 122 may accept and route the network requests 180 without dropping the requests, in some embodiments (e.g., according to the default route added as discussed above). Moreover, as edge router 122 can interpret overlay network routes instead of sending the requests through a virtualized private network host to resolve the traffic, the use of a virtual private interface can be eliminated. For example, as discussed below with regard to FIGS. 2-5, a dedicated physical connection between a client router and provider network router can offer a private network connection that bypasses a public network like the Internet. Extending the overlay network in such scenarios can eliminate the necessity of a VPN connection between a client network and substrate network 120 entirely, in some embodiments.

Please note that previous descriptions are not intended to be limiting, but are merely provided as an example of substrate networks, client networks, resources, routers, network managers, and client devices. The number or arrangement of components may be implemented in many different ways.

This specification next includes a general description of a provider network, which may implement extending an overlay network to edge routers of a substrate network. Then various examples of a provider network are discussed, including different components/modules, or arrangements of components/module that may be employed as part of implementing extending an overlay network to edge routers of a substrate network. A number of different methods and techniques to implement extending an overlay network to edge routers of a substrate network are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
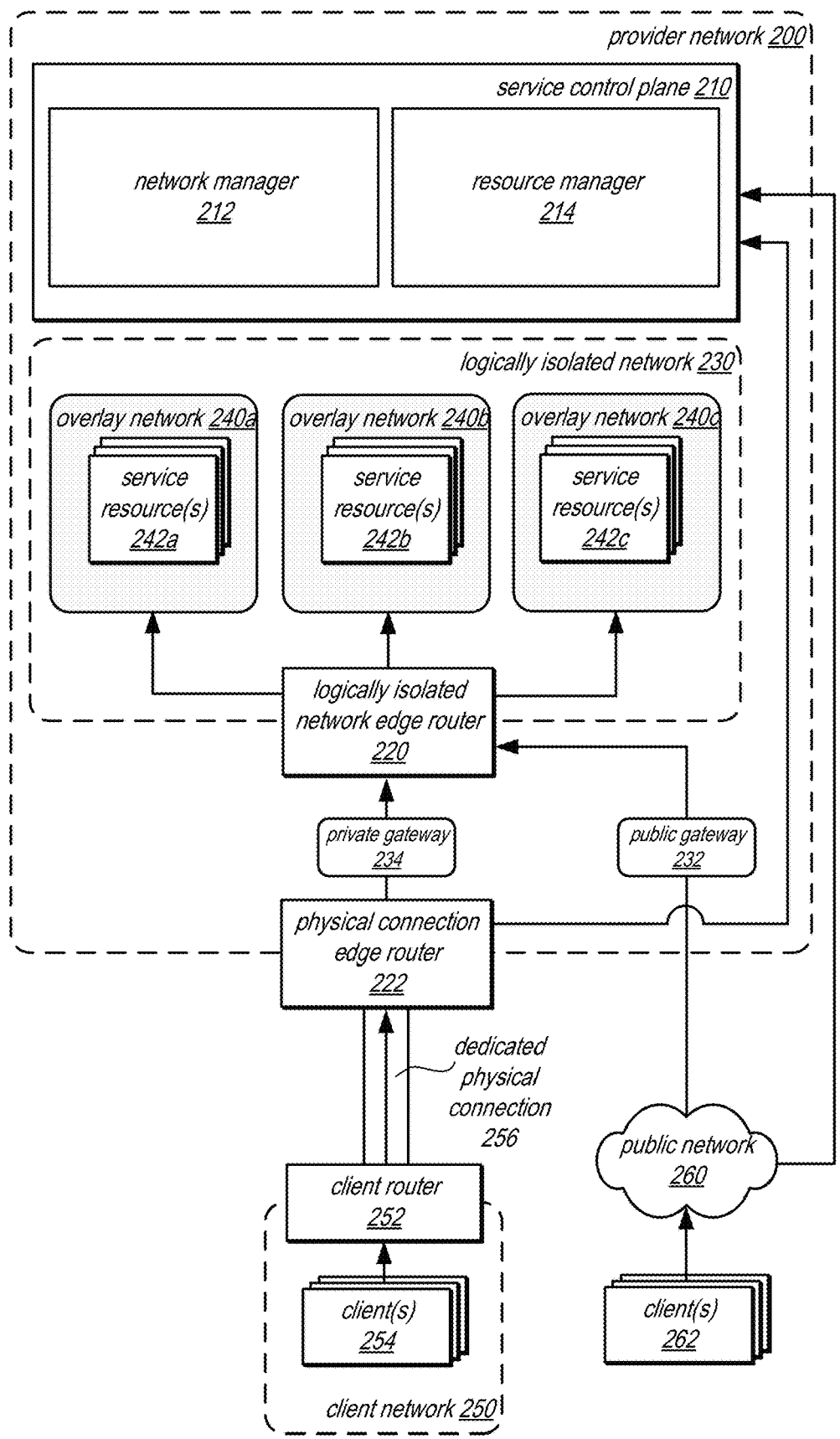
FIG. 2 is a logical block diagram of a provider network that implements network gateways that can be associated with route tables of overlay networks, according to some embodiments.

FIG. 2 is a logical block diagram of a provider network that implements network gateways that can be associated with route tables of overlay networks, according to some embodiments. Provider network 200 may offer various computing resources to clients, such as various types of data analysis, processing, and storage. Computationally intensive applications or systems may utilize multiple distributed computing resources in provider network 200 to provide scalable solutions for a variety of different computing applications. Provider network 200 may be set up by an entity such as a company or a public sector organization to provide one or more network-based services (such as various types of cloud-based computing or storage) accessible to clients (e.g., internal clients operating within provider network using provider network resources, or external clients, such as clients 262 via a public network 260 (e.g., the Internet), or clients 254 via a dedicated physical connection 256.

Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may implement multiple fault tolerant zones, which may isolate failures to a particular zone such that a failure in or of one fault tolerant zone may not cause or trigger a failure in another fault tolerant zone (allowing computing resources in the other fault tolerant zone to continue operating in the event of a failure of another fault tolerant zone). Different data centers, isolated power or computing infrastructures, and/or other provider network architectures may be implemented to provide multiple fault tolerant zones (sometimes referred to as availability zones). While grouped together in FIG. 2, different resources for a client network, such as resource(s) 242a, 242b, or 242c, may be distributed across fault tolerant zones (not illustrated), in some embodiments.

Provider network 200 may include the hardware (e.g., modems, routers, switches, load balancers, proxy servers, etc.) and software (e.g., protocol stacks, accounting software, firewall/security software, etc.) necessary to establish networking links between different components of provider network 200 as well as external networks (e.g., the Internet) or client networks with dedicated physical connections. In some embodiments, provider network 200 may employ an Internet Protocol (IP) tunneling technology to provide an overlay network via which encapsulated packets may be passed through the provider network 200 using tunnels (which may be a substrate network upon which other networks, like logically isolated network 230 and overlay networks 240, may be implemented).

Like provider network 200, a client network 250 may offer or provide various applications or services to users of the client network 250, utilizing resources such as client devices 252. For example, client network 250 may be one or more internal networks for one (or multiple) companies, enterprises or organizations. In some embodiments, client network 250 may provide publicly available services, which may be accessible via a public network like the Internet. As part of providing the respective services or functions, client network 250 may utilize various resources offered by provider network 200.

In order to enable connectivity between a client network 250 and multiple resource(s), such as resources 242a, 242b, and 242n, a dedicated physical connection 256 may be implemented. For example, the dedicated physical connection may include one or cables physically linking a pair of co-located routers, one belonging to or managed by the provider network (e.g., physical connection edge router 222) and one belonging to or managed by a client network (e.g., client router 252). However in some embodiments, a third party or entity may operate one or both of physical connection edge router 222 or client router 252. In at least some embodiments, the physical connection edge router 222 and the client router 254 may be located within a co-location facility. However, in other embodiments the two routers may not be located within a same facility or location.

In various embodiments, dedicated physical connection 256 may be utilized to provide a connection and interface to resources 242 in a provider network 200 via a private gateway 234. In at least some embodiments, private gateway 234 may be a physical or virtual network gateway to access logically isolated network 230 according to a private connection, such as dedicated physical connection 256. For example, private gateway 234 may enforce or otherwise implement access controls or security protocols to ensure that the network traffic received through private gateway 234 remains private to the client and destination resource that are communicating. In order to establish a private gateway 234, control request that the private gateway 234 be established over the already established dedicated physical connection 256 can be received. Various parameters may have to be supplied to an administrative component of provider network 200, such as network manager 212, in some embodiments. These parameters may include, for example, one or more of: (a) a VLAN (virtual local area network) identifier or tag that complies with the Ethernet 802.1Q standard, (b) an Internet Protocol (IP) prefix, address range or address, (c) a Border Gateway Protocol (BGP) Autonomous System Number (ASN), or (d) a BGP key. Once established, various systems, components, or devices 254 in client network 250 may communicate with resources 242 through the private gateway 234.

In some embodiments, a VPN connection between a client implemented gateway within a client network 250 (not illustrated) could be established with private gateway 234 to provide a virtual private connection. Such communications could pass over a public network like public network 260, but may utilize private gateway 234 to access resources 240.

Public gateway 232 may provide a physical or virtual gateway that allows communications between resources 242 hosted within logically isolated network 230 and a public network, such as a wide area network like the Internet. For example, an overlay network 240 may include a network route that points to public gateway 232 in order to allow traffic to and from resources in the overlay network 240 via public network 260, in some embodiments.

Provider network 200 may allow for portions of provider network 200 to be provisioned as a logically isolated network 230 within or portion of provider network 200, in order to allow a customer or user to specify the configuration of the provider network, utilizing features such as specifying a range of network addresses (e.g., via a CIDR block), creation of overlay networks, such as overlay networks 240a, 240b, and 240c (which may be specified as different subnets with different CIDR blocks), create and/or manage network route tables and gateways (e.g., like public gateway 232 and private gateway 234). One or more network devices, such as logically isolated network edge router 220, may implement or enforce the specified network configuration, such as handling requests received via private gateway 234 and public gateway 232 according to the parameters or configuration of those gateways, in some embodiments.

Service resources, such as service resources 242a, 242b, 242c, may be resources of one or multiple different services offered by provider network 200 (e.g., virtual compute, data processing, data storage, etc.). Provider network 200 may implement one (or more) of service control plane 210 to manage the various resources 242 offered by provider network 200. Service control plane 210 may be implemented by various collections servers, nodes, computing systems or devices, such as may be generally described below with regard to computing system 1000 in FIG. 8. Service control plane 210 may implement an interface (not illustrated), which may be accessible either by client devices 254 over dedicated physical connection 256, or by client devices 262 using public network 260 (which may be associated with client network 250 or linked to common customer accounts of the different client networks). The interface may dispatch request to the appropriate service control plane component (s) to handle the requests such as requests to procure, reserve, enable, disable, configure, or otherwise manage the resources 242 dispatched to resource manager 214 and/or various network management requests sent to network manager 212 to manage logically isolated network 230 and/or overlay networks 240. For example, the interface may provide the various interfaces described below with regard to FIG. 3. The interface may be programmatic, such as may be implemented by an Application Programming Interface (API), and/or a graphical user interface (GUI), in some embodiments.

In at least some embodiments, service control plane 210 may implement various resource management functions as part of resource manager 214. For example, launching and configuring the various resources 242 may be internally managed and performed by resource manager 214. Other control plane function(s) may also be implemented by other management components not illustrated, and may include authenticating client(s) (e.g., associating them with particular customer accounts), metering resource usage for different client networks, billing customer accounts associated with the client networks, and any other management or control functions to provide the various services of provider network 200.

Figure 3A:
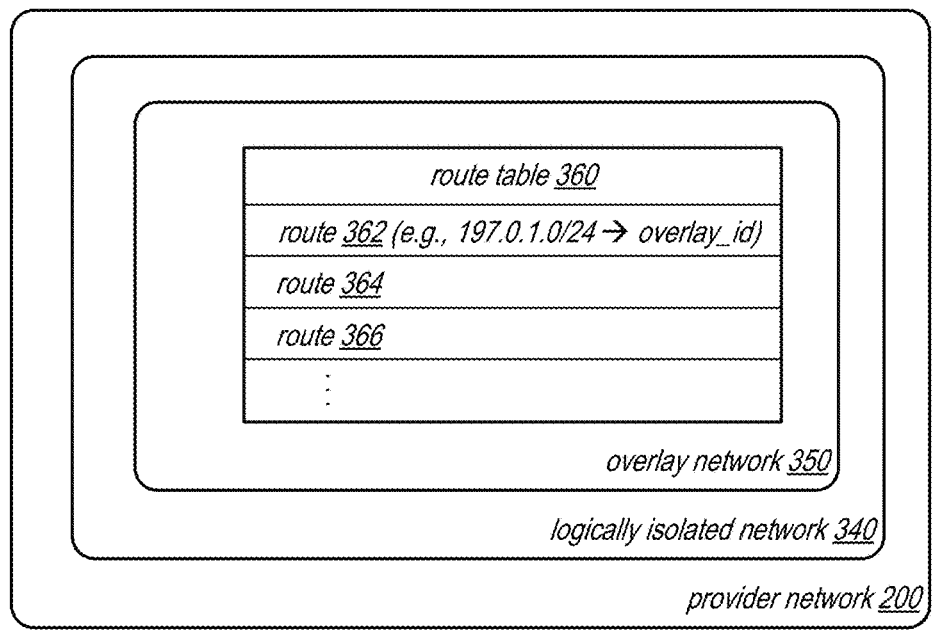
FIG. 3A is logical block diagram illustrating a route table of an overlay network that may be associated with network gateways, according to some embodiments.
Figure 3B:
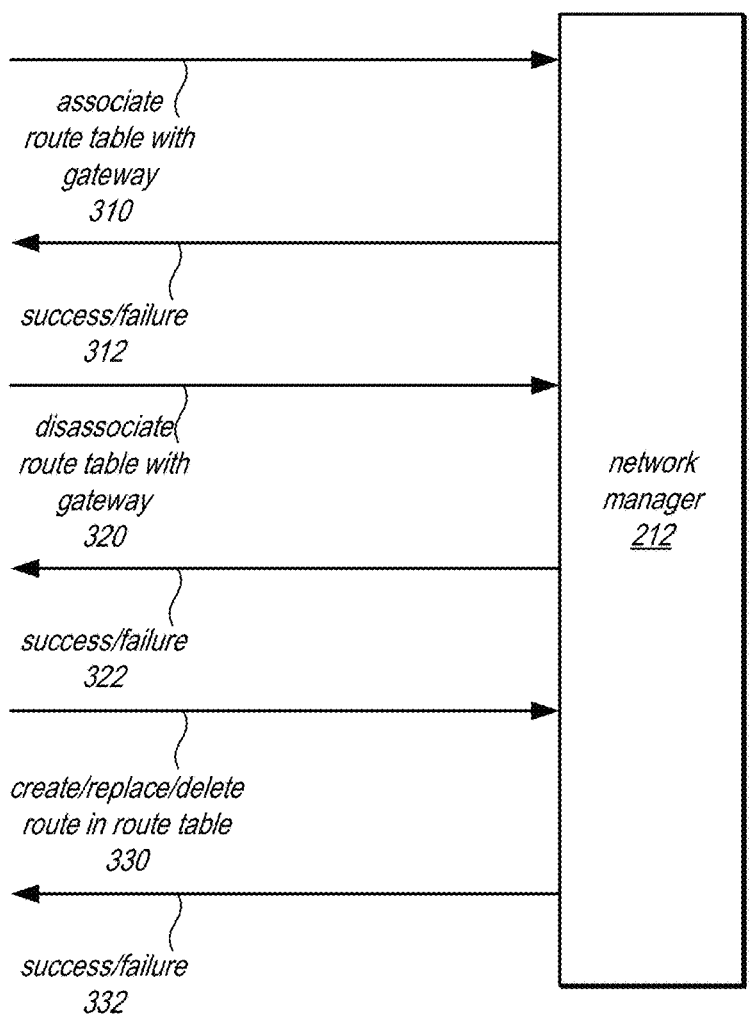
FIG. 3B is a logical block diagram illustrating example interactions to manage network routes of an overlay network, according to some embodiments.
Figure 4:
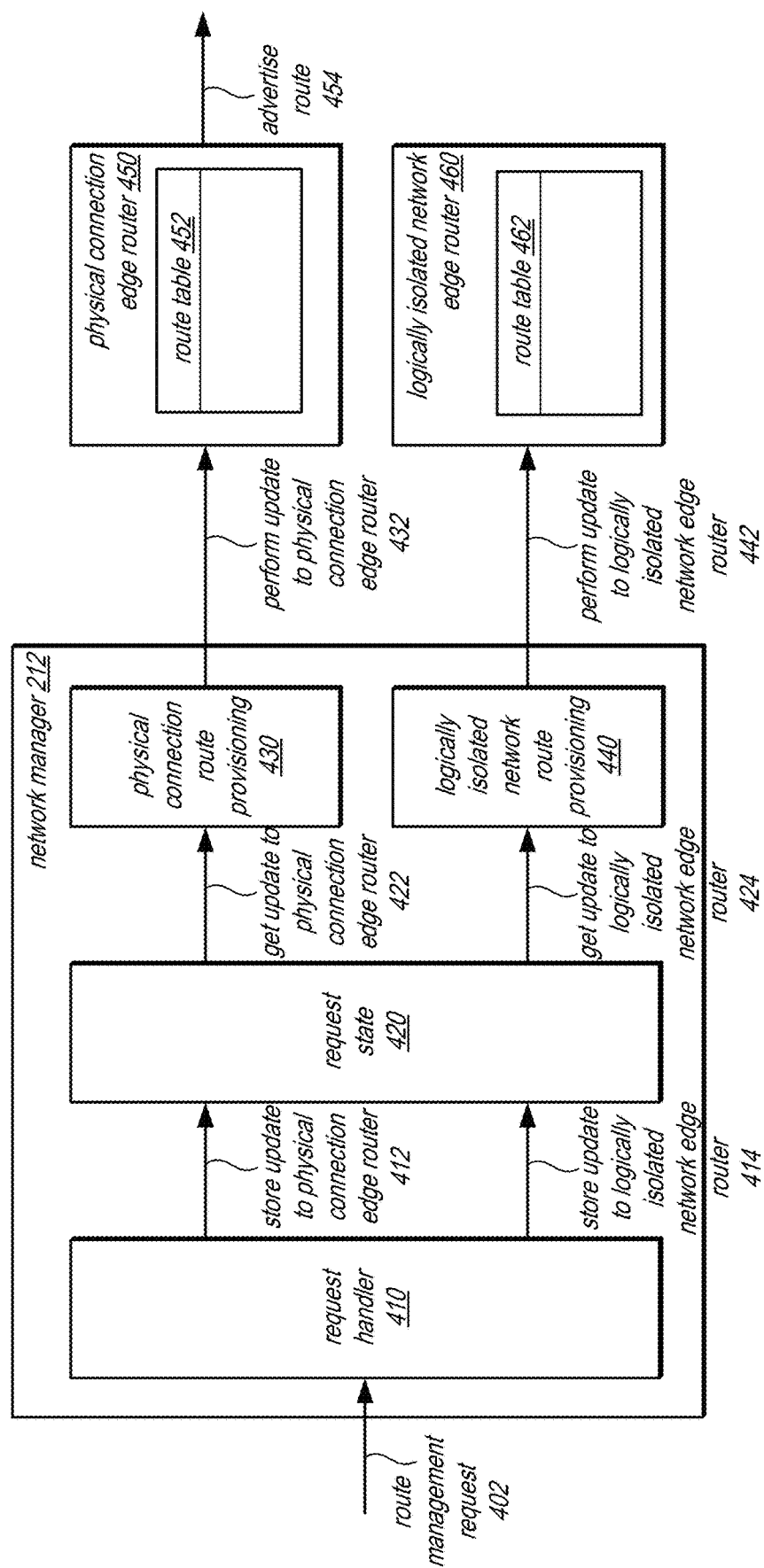
FIG. 4 is a logical block diagram illustrating interactions to handle a route management request at a network manager, according to various embodiments.

Service control plane 210 may implement network manager 212, as discussed in more detail below with regard to FIGS. 3 and 4 to manage logically isolated networks and overlay networks for resources 242. In some embodiments, network manager 212 may be implemented as a separate service from the resource host service (e.g., utilizing a separate control plane to manage servers, hosts, or other computing devices that manage networks and a separate data plane to store network management information (e.g., routing tables, access rules, etc.). Thus, the previous example architecture is not intended to be limiting.

In various embodiments, clients 254 or 262 may encompass any type of client that can utilize, manage, operate or configure connections or resources in provider network 200. For example, a client may implement various tools, scripts, or other modules that may be able to configure a respective logically isolated network 230 or overlay network 240. As part of managing the networks, clients 254 or 262 may submit various requests to provider network 200 via an interface for service control plane. In order submit requests to provider network 200, a client may include a suitable version of a web browser, or may include a plug-in module or other type of code module configured to execute as an extension to or within an execution environment provided by a web browser. Alternatively, a client may encompass an application such as a resource/connection management or information client (or user interface thereof) that may make use of provider network 200 to manage various resources and connections. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 262 may be configured to generate network-based services requests according to a Representational State Transfer (REST)-style network-based services architecture, a document- or message-based network-based services architecture, or another suitable network-based services architecture In some embodiments clients 262 may convey requests to provider network 200 via a public network 260, which may be a public connection to provider network 200. In various embodiments, the public network 260 may encompass any suitable combination of networking hardware and protocols necessary to establish network-based communications between clients 262 and provider network 200. For example, a network may generally encompass the various telecommunications networks and service providers that collectively implement the Internet. A network may also include private networks such as local area networks (LANs) or wide area networks (WANs) as well as public or private wireless networks.

Network routes may be network addresses (e.g., in IPv4 or IPv6 format) or other network location identifier that can identify a next hop or location to which a network message, communication, or other traffic (e.g., a network packet) may be sent. Network routes may be specified for locations within an overlay network, in some embodiments, in order to direct how traffic destined for different network addresses in the overlay network. FIG. 3A is logical block diagram illustrating a route table of an overlay network that may be associated with network gateways, according to some embodiments. Route tables may be associated with or specified for various levels within provider network 200. For instance, a provider network 200 may have internal or private route tables which are not visible or exposed to devices external to provider network 200 in order to make routing decisions at network devices such as routers within provider network 200. A logically isolated network 340 may have a route table to handle requests directed to the logically isolated network 340 (e.g., in default scenarios where no other route table or entry applies, such as an overlay network route table). As illustrated in FIG. 3A, overlay networks, such as overlay network 350, may have a route table, such as route table 360, which may specify overlay routes, such as routes 362, 364, and 366. An overlay route may include a destination entry, such as the illustrated CIDR block "197.0.1.0/24" which may all be routed to an overlay network identifier "overlay_id" (e.g., a network address, which may be an identifier for the overlay network and thus may direct traffic to resources in the overlay network for transmission to their respective destinations within the CIDR block). Some routes may point to other features, such as a public network gateway to indicate that network traffic from that gateway is allowed in the overlay network 350.

Various different requests to manage or manipulate logically isolated networks and overlay networks may be implemented, in some embodiments. Requests to create a logically isolated network or overlay network may automatically generate a blank or default value route table. In some embodiments, a route table may be explicitly created via a request to network management. In addition to these requests, requests to manage network routes of an overlay network may also be performed, as illustrated in FIG. 3B, according to some embodiments.

As indicated at 310, a request to associate a route table with a gateway may be received at network manager 212. The request 310 may be a request to make an overlay route available, as discussed above with regard to FIG. 1 and below with regard to FIG. 6. Associating a table with a gateway, such as a public gateway or private gateway, cause the update of appropriate edge routers in order to make network routes in the route table for the overlay network available through the identified gateway. The route table may be identified using an identifier value, or may be identified according to a link between the route table and the CIDR block to which the route table specifies routes. The gateway may be identified according to an identifier or network address, in some embodiments. The request may specify the CIDR block associated with the overlay network, and or an overlay network identifier (e.g., the network address of the overlay network as illustrated in FIG. 3A). In some embodiments, other metadata to track the state of the association request may be created and stored by network manager 212 (e.g., a request identifier and state, such as "associating" "associated" or "failed"). Network manager 212 may perform various validations on the request, as discussed below with regard to FIG. 7. A success/failure response 312 may be returned (e.g., an indication of request state such as "associating" or "failed").

As indicated at 320, a request to disassociate a route table with a gateway may be received at network manager 212, in some embodiments. The request 320 may identify the route table (e.g., according to identifier or according to a link between the gateway and the route table), in some embodiments. The gateway may be identified using an identifier value or by traversing a link between the route table and an object to which it is applied, in some embodiments. A success/failure response 322 may be returned (e.g., an indication of request state such as "disassociating" or "failed").

As indicated at 330, requests to create, replace, or delete routes in a route table may be received, in some embodiments, at network manager 212. The requests 330 may trigger a lookup or check when received to determine if they cause an update to an edge router, in some embodiments (e.g., if the created, replaced, or deleted route is part of a route table that is already associated with a gateway). A success/failure response 332 may be returned (e.g., an indication of request state such as "creating" "replacing" "deleting" or "failed").

Other management requests not illustrated may be supported by network manager 212, in some embodiments. For example, a request to describe route tables may be performed that lists the created route tables of a logically isolated network and/or overlay network, the associated gateways (if any), the routes in the tables (if any), among other route table information. Some requests may indirectly affect associated route tables. For example, a request to remove a gateway may automatically trigger the disassociation of route tables with the gateway, in some embodiments, or may be indirectly affected by associated route tables (e.g., failing requests to add additional overlay networks if a number of route tables associated with gateways exceeds a limit or failing requests to enable gateway properties that conflict with the associated route tables of the gateway, such as a request to enable route propagation at a gateway).

Various ones of the requests discussed above with regard to FIG. 3, may include trigger, causing, or otherwise performing updates to edger routers in order to extend an overlay network as described in network routes of a route table. FIG. 4 is a logical block diagram illustrating interactions to handle a route management request at a network manager, according to various embodiments. A route management request 402, as illustrated in FIG. 4, may be any request that causes or triggers a route table to be associated with, modified, or disassociated with a gateway, in some embodiments.

Network manager 212 may implement various features or components to perform appropriate operations responses to requests 402. For example, network manager 212 may implement request handler 410 to identify the type of request, operations to be performed, and generate the appropriate information to perform the request. For requests made to with respect to a route table and overlay network accessed by a dedicated physical connection, as discussed above in FIG. 2, then updates may be determined to perform the update to a physical connection edge router 450 that communicates with client devices via the dedicated physical connection. For example, request handler 410 may store an update to be performed to a physical connection edge router 412 in request state 420. The request state 420 may be stored a message, record, or other data structure/format that identifies the involved route table (e.g., according to an identifier), overlay network (e.g., according to an overlay network identifier and/or subnet, such as a CIDR block in one or multiple network address formats like IPv4 and/or IPv6), gateway (e.g., according to an identifier), change to be made (e.g., additional routes to add, remove, replace), and/or any other information to perform the request 402. Similarly, information to perform the update at a logically isolated network edge router 460, as discussed above with regard to FIG. 2, may be stored 414 in request state. Version information for the route table or logically isolated network may be updated in order to indicate that a change to the logically isolated network or overlay network within has occurred (e.g., by incrementing a version identifier).

Separate provisioning or update components may be implemented for different types of routers, in some embodiments. For example, physical connection route provisioning 430 may be update physical connection edge routers like physical connection edge router 450. Similarly, logically isolated network route provisioning 440 may update logically isolated network edge routers, like logically isolated network edge router 460. In this way, separate route table updates for different types of edge routers may be independently perform so that different performance considerations for handling the workload of updates may be made (e.g., prioritizing some types of updates at physical connection edge routers differently than logically isolated network edge routers), in some embodiments. Physical connection route provisioning 430 may get (e.g., using a pull or push-based notification scheme) updates 422 from request state 420 and perform 432 the update to physical connection edge router 450. For example, physical connection route provisioning 430 may send an instruction to update route table 452 with a new network route, remove a network route, and/or modify an existing network route, which physical connection edge router 450 can then perform according to a route table update operation (e.g., updating internal tables in memory such as content addressable memory (CAM) or random access memory (RAM) and/or in persistent storage (e.g., flash-based storage). Router table 452 may be a router-specific route table (e.g., a forward or next-hop address table) and thus may be different than the route table of the overlay network associated with the gateway, in some embodiments.

Similarly, logically isolated network route provisioning 440 may get (e.g., using a pull or push-based notification scheme) updates 424 from request state 420 and perform 432 the update to logically isolated network edge router 460. For example, logically isolated network route provisioning 440 may send an instruction to update route table 462 with a new network route, remove a network route, and/or modify an existing network route, which logically isolated network edge router 460 can then perform according to a route table update operation (e.g., updating internal tables in memory such as content addressable memory (CAM) or random access memory (RAM) and/or in persistent storage (e.g., flash-based storage) with a default route). Route table 462 may be a router-specific route table (e.g., a forward or next-hop address table) and thus may be different than the route table of the overlay network associated with the gateway, in some embodiments.

Physical connection edge router 450 can advertise routes 454 from route table 452 according to various routing protocols (e.g., BGP) so that other devices, like client network routers in FIG. 2, can route traffic according to the overlay network routes included in the advertised routes, as discussed below with regard to FIG. 5. Although FIG. 4 illustrates physical connection edge router 450 advertising the route, in some embodiments, logically isolated network edge router 460 can advertise routes (e.g., for an internet gateway that is associated with the route table or a VPN peering connection/gateway that is associated with the route table).

Figure 5:
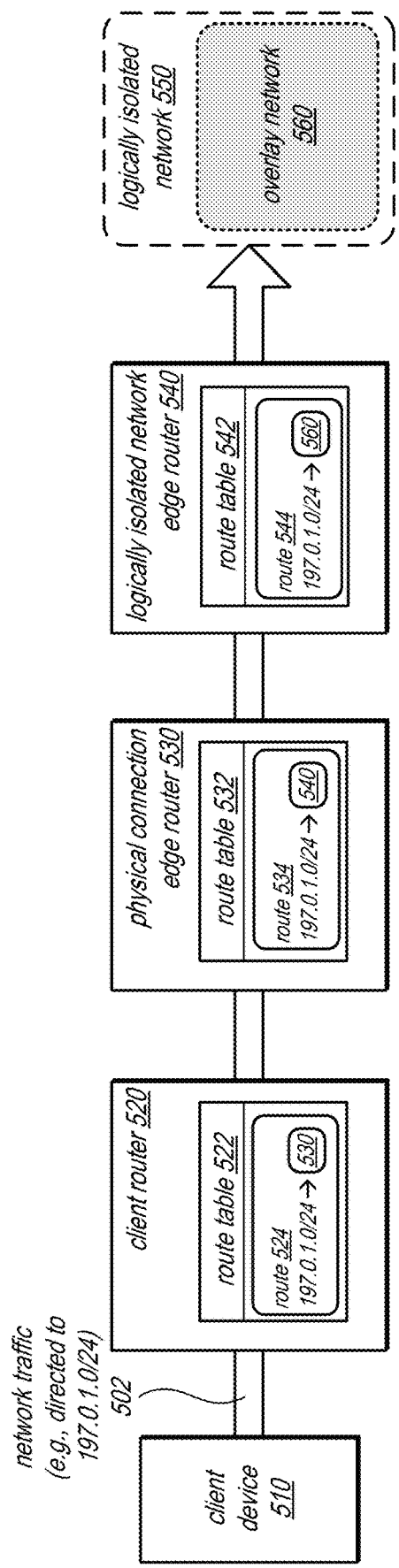
FIG. 5 is a logical block diagram illustrating routing network traffic directed to an overlay network extended to edge routers, according to various embodiments.

FIG. 5 is a logical block diagram illustrating routing network traffic directed to an overlay network extended to edge routers, according to various embodiments. Client device 510 (which may be similar to client device 254 in FIG. 2) may be above to submit network traffic 502 (e.g., network packets) directed to an overlay network, which may be directed to a destination address within the cited block of the overlay network, such as "197.0.1.0/24" as illustrated in FIG. 5. Client router 520 may compare traffic with entries in route table 522 and identify route 524 as a matching entry because destination route is within "197.0.1.0/24". Route 524 may point to physical connection edge router 530 (e.g., via a network address or other identifier for physical connection edge router 530) and forward the traffic to physical connection edge router 530. Physical connection edge router 530 may perform a lookup operation at route table 532 with respect to the destination and identify that the traffic is destined for an address within "197.0.1.0/24" and thus may identify route 534 as the matching entry. In some embodiments, route 534 may be a default route that is identified after no matching route is found. Route 534 may direct physical connection edge router 530 to forward the traffic to logically isolated network edge router 540 (e.g., via a network address or other identifier for logically isolated network edge router 540). Logically isolated network edge router 540 may perform a lookup operation for the network traffic and determine that route 544 in route table 542 is the matching entry. In some embodiments, route 544 may be a default route that is identified after no matching route is found. Route 544 may direct logically isolated network edge router 540 to forward the network traffic to an identifier of an overlay network 560 in logically isolated network 550, according to various embodiments. In this way, the native route tables of the different routers can directly route traffic without utilizing another connection, such as a VPN connection. Similar techniques could be performed using a public network that connects a client device 510 to a logically isolated network edge router (instead of using a dedicated physical connection in scenarios where traffic may not have to be secure), in some embodiments.

Figure 6:
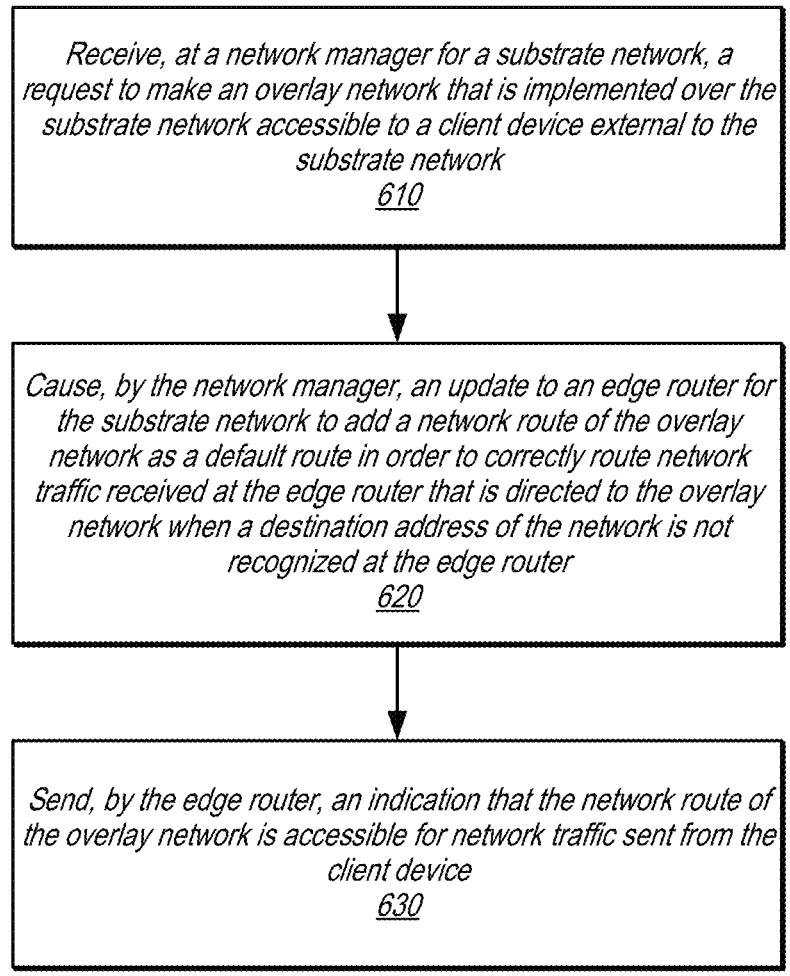
FIG. 6 is a high-level flow chart that illustrates various methods and techniques for extending an overlay network to edge routers of a substrate network, according to various embodiments.

The examples of implementing extending an overlay network to edge routers of a substrate network discussed above with regard to FIGS. 2-5 have been given in regard to a provider network. Various other types or configurations of a system or service that hosts network resources and allows overlay networks to be configured for the network resources may implement these techniques. Thus, components such as client routers, edge routers, overlay networks, the network manager, interfaces, physical dedicated connection, computing services or resources, or any other component of the provider network, or client network, may be differently implemented. FIG. 6 is a high-level flow chart that illustrates various methods and techniques for extending an overlay network to edge routers of a substrate network, according to various embodiments. These techniques may be implemented using various components of a provider network as described above with regard to FIGS. 2-5 or other provider network components.

As indicated at 610, a request to make an overlay network that is implemented over a substrate network accessible to a client device external to the substrate network may be received at a network manager for the substrate network, in some embodiments. The request may identify the overlay network according to an overlay network identifier or range of network addresses mapped to/by/within the overlay network (e.g., in a CIDR block which may designate a range of possible network address where, for instance, a suffix may indicate how many bits are masked (e.g., "/24") when applied to a network address (e.g., "255.255.255.240") to provide a range between "255.255.255.0" and "255.255.255.255" which may be 256 different addresses). The request may identify or indicate which type client device is to gain access (e.g., is the request for a client device implemented in a client network connected via a dedicated physical connection or a client device that can connect to the substrate network and overlay network via a public network. In some embodiments, the request, like the association request discussed above with regard to FIG. 3 and below with regard to FIG. 7, may be part of a request to associate a route table, while in other embodiments, the request may identify an individual route to be made available.

As indicated at 620, an update to an edge router for the substrate network to add a network route of the overlay network as a default route in order to correctly route network traffic received at the edge router that is directed to the overly network when a destination address is not recognized at the edge router may be caused, in some embodiments. When network traffic is received that is directed to the overlay network, the edge router may perform a lookup on a destination address of the network traffic. If an entry for the destination address were not found (as would occur when the network traffic is directed to the overlay network instead of the substrate network), the default route may automatically forward the route to a next hop address that can interpret the overlay destination address (instead of dropping the traffic as would occur without the default route). The update may be performed by provisioning entries or space within a route lookup table, next hop address table, or other data storage at the edge router that stores routes for the default route. In some embodiments, the route table at the edge router may be used to implement lookup features such as a longest prefix match comparison utilizing specialized memory like a Ternary Content Addressable Memory (TCAM), or other route lookup/matching technique if more than one default route were added.

As indicated at 630, an indication may be sent by the edge router, that the network route of the overlay network is accessible for network traffic sent from the client device, in some embodiments. For example, the edge router may utilize BGP protocol or other notification communications to advertise the availability of the route at the edge router for forwarding network traffic. Alternatively, in some embodiments, a request indicating completion may be sent instead of or in addition to the indication of the network route at the edge router.

The techniques described above can be adapted for different types of network gateways for accessing substrate and overlay networks. For example, a public network gateway, as discussed above with regard to FIG. 2, can be associated with a route table so that an overlay network can be accessible via an edge router that receives traffic from a public network gateway. In some embodiments, multiple overlay networks can be associated with a single gateway. For example, a longest prefix matching technique may be implemented to select the overlay network with the longest matching prefix when forwarding network traffic at an edge router.

Figure 7:
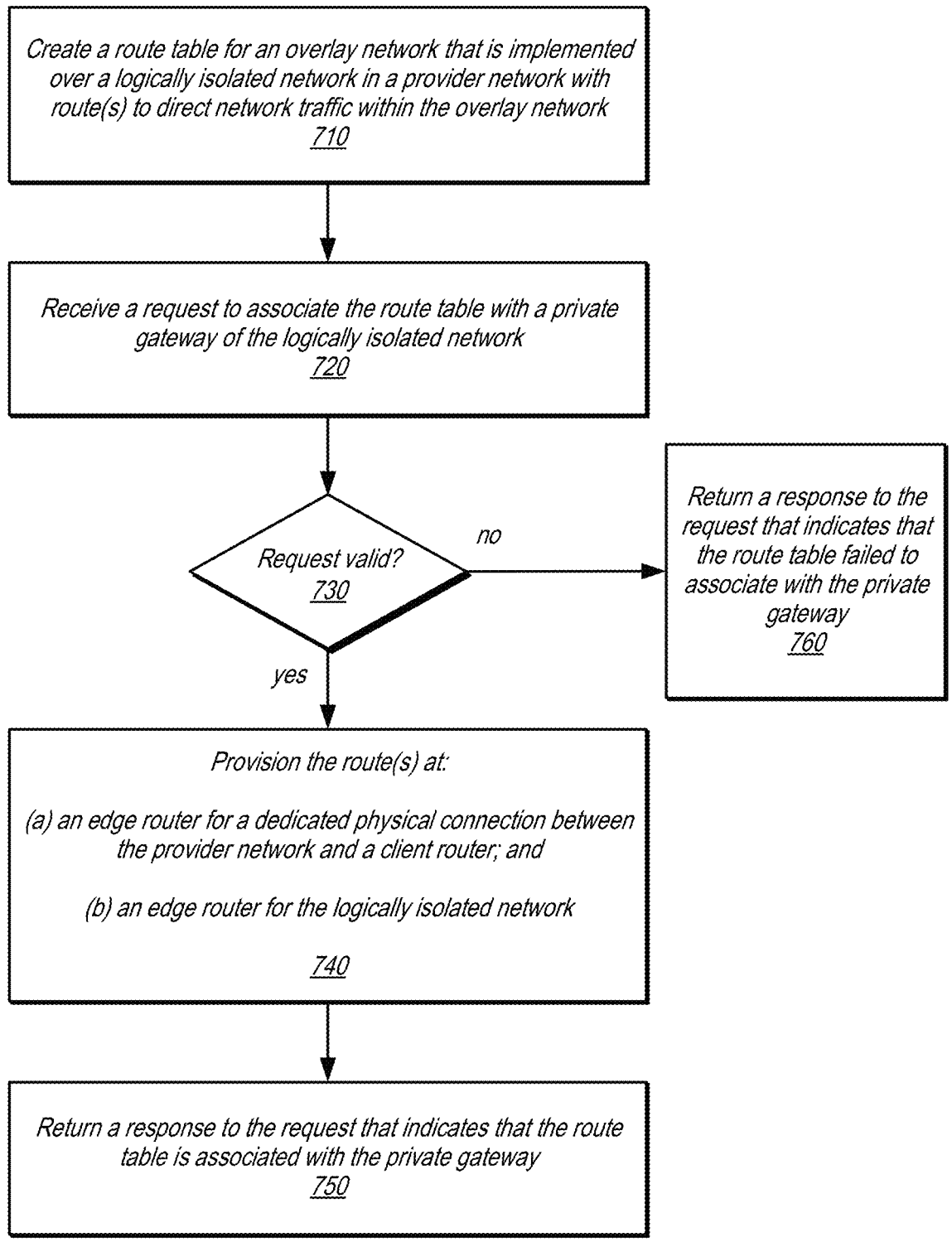
FIG. 7 is a high-level flow chart that illustrates various methods and techniques for associating a route table of an overlay network with a network gateway of a logically isolated network, according to some embodiments.

As discussed above, a dedicated physical connection can be used to send network traffic via a private gateway to an overlay network implemented on a logically isolated network. FIG. 7 is a high-level flow chart that illustrates various methods and techniques for associating a route table of an overlay network with a network gateway of a logically isolated network, according to some embodiments. As indicated at 710, a route table for an overlay network that is implemented over a logically isolated network in a provider network may be created to direct network traffic within the overlay network, in some embodiments. For example, the route table may be created when the overlay network is created (e.g., with default routes). In some embodiments, a route table may be manually created using a control request or instruction sent to a network manager from a user via an interface. The route table may have an identifier, in some embodiments and may have a version number or other form of change tracking recorded, in some embodiments. The route table may have various rules that are validated or enforced upon creation of or change to the route table (e.g., not exceeding the network address bounds of the logically isolated network or overlapping with another previously overlay network), in some embodiments.

As indicated at 720, a request to associate the route table with a private gateway of the logically isolated network may be received, in some embodiments. As discussed above the request may identify the route table using an identifier value (e.g., created above), or may be identified according to a link between the route table and the CIDR block to which the route table specifies routes. The private gateway may be identified according to an identifier or network address, in some embodiments. The request may specify the CIDR block associated with the overlay network, and or an overlay network identifier, in some embodiments.

The request may be validated according to various criteria, in some embodiments. For example, non-local routes (e.g., not local to the substrate network, such as overlay routes) may have to point to the same target private gateway and/or may not exceed a number of routes to be advertised external to the substrate network (e.g. less than 16 routes). In some embodiments, the configuration of the private gateway may be analyzed to determine if the private gateway configuration would conflict with externally advertising the route(s). If, as indicated by the negative exit from 730, the request is not valid, then a response to the request may be returned that indicates that the route table failed to associate with the private gateway, as indicated at 760, in some embodiments. For example, a state or status indication may be returned, or an error code or other indication as to why the request was not valid. In some embodiments, an invalid request could trigger automated operations to cure the invalid criteria (e.g., reconfigure the private gateway to not conflict with the associated route table).

If, as indicated by the positive exit from 730, the request is valid, then the route table may be associated with the private gateway. For example, as indicated at 740, route(s) of the route table may be provisioned at (a) an edge router for a dedicated physical connection between the provider network and a client router; and (b) an edge router for the logically isolated network, in some embodiments. In this way, network traffic that originates from a client device may be directed to an overlay network address without secondary connections, such as a VPN, to interpret or route the network traffic. Instead, as illustrated above in FIG. 5, the edge router for the physical network connection and the edge router for the logically isolated network can work together to forward network traffic received from a client device external to the provider network that indicates as its destination an overlay network address, thus extending the overlay network to the client device, in some embodiments.

As indicated at 750, a response to the request may be returned that indicates that the route table is associated (e.g., in the process or is completed association) with the private gateway, in some embodiments.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the router data service described herein). The various methods as illustrated in the figures and described herein represent example embodiments of methods. The order of any method may be changed, and various elements may be added, reordered, combined, omitted, modified, etc.

Figure 8:
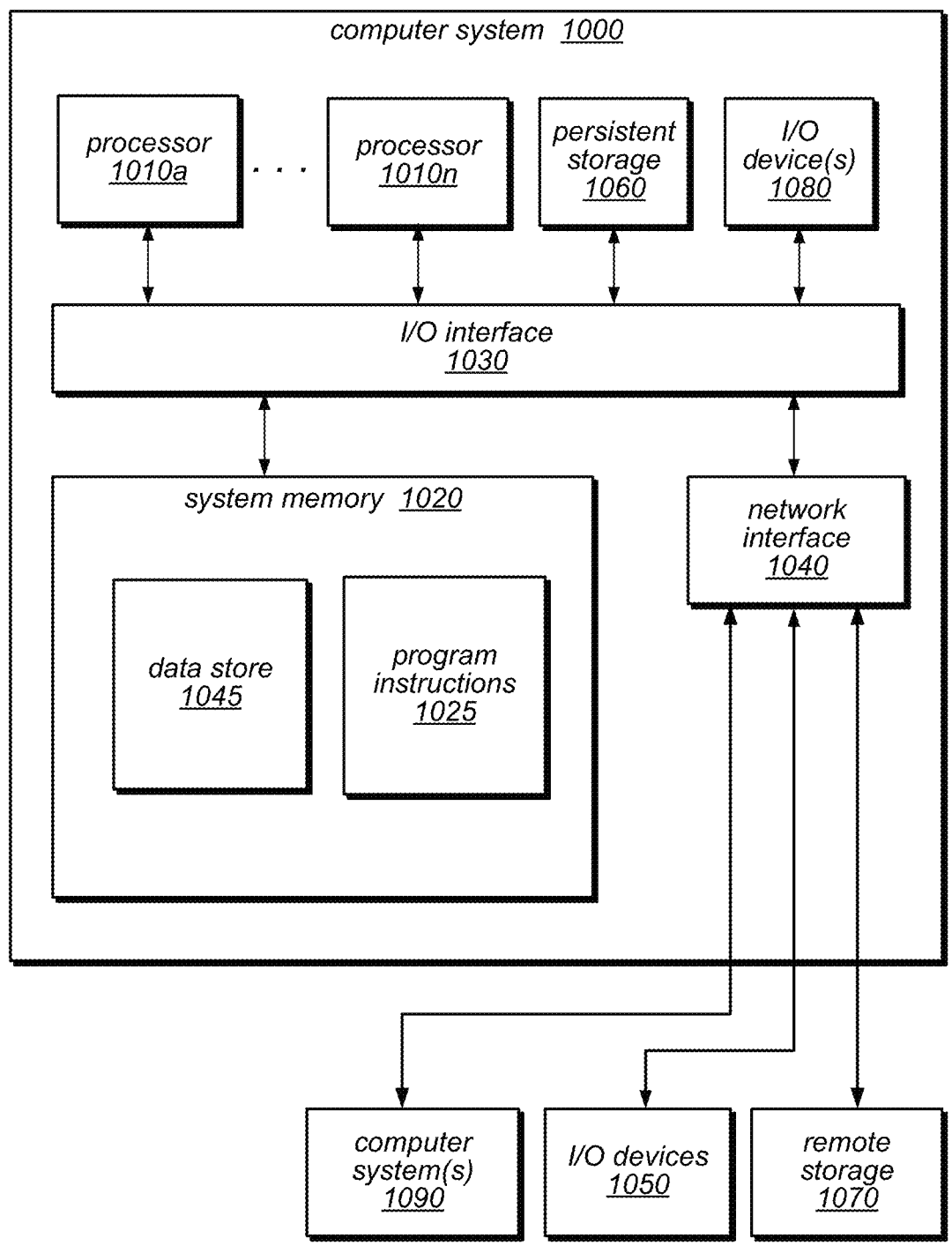
FIG. 8 is a block diagram illustrating an example computing system, according to some embodiments.

Embodiments of extending an overlay network to edge routers of a substrate network as described herein may be executed on one or more computer systems, which may interact with various other devices. FIG. 8 is a block diagram illustrating an example computer system, according to various embodiments. For example, computer system 1000 may be configured to implement nodes of a provider network, such as may implement various resources, a control plane, or diagnostic agents, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more nodes, endpoints, systems, or services internal to or external to a provider network, and/or clients of the provider network described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more nodes, that respectively comprise at least one processor and a memory that implement a network manager for a provider network;
the one or more nodes to:
receive a request to associate a route table of an overlay network that is implemented over a logically isolated network of the provider network with a gateway for the logically isolated network to make the overlay network accessible to a client device external to the provider network;
responsive to the request, cause an update to an edge router for the provider network to add a network route of the route table for the overlay network as a default route in order to correctly route network traffic received at the edge router that is directed to the overlay network when a destination address of the network traffic is not recognized at the edge router; and
the edge router to send an indication that the network route of the route table of the overlay network is accessible for network traffic sent from the client device.

2. The system of claim 1, wherein the one or more nodes further send a response to the request to indicate that the route table is associated with the gateway for the logically isolated network.

3. The system of claim 1, wherein the edge router forwards network traffic to the overlay network that is sent from the client device and directed to the overlay network according to the network route.

4. The system of claim 1, wherein the provider network includes one or more service resources within the overlay network, wherein the edge router is an edge router that provides a dedicated physical connection between a client router implemented in a client network external to the provider network and the edge router for the dedicated physical connection, wherein the client device is implemented as part of the client network, wherein the gateway is a private gateway that receives the network traffic from the edge router, and wherein the system further comprises another edge router that is an edge router for the logically isolated network, and wherein the one or more nodes further:
cause an update to the edge router for the logically isolated network to add the network route of the route table for the overlay network as a default route in order to correctly route network traffic received at the edge router for the logically isolated network that is directed to the overlay network when a destination address of the network traffic is not recognized at the edge router.

5. A method, comprising:
receiving, at one or more computing devices that implement a network manager for a substrate network, a request to make an overlay network that is implemented over the substrate network accessible to a client device external to the substrate network;
responsive to the request, causing, by the network manager, an update to an edge router for the substrate network to add a network route of the overlay network as a default route in order to correctly route network traffic received at the edge router that is directed to the overlay network when a destination address of the network traffic is not recognized at the edge router; and
sending, by the edge router, an indication that the network route of the overlay network is accessible for network traffic sent from the client device.

6. The method of claim 5, wherein the substrate network is a logically isolated network.

7. The method of claim 5, wherein the request to make the overlay network that is implemented over the substrate network accessible to the client device external to the substrate network is a request to associate a route table of the overlay network with a gateway via which network traffic is received for the substrate network.

8. The method of claim 7, wherein the method further comprises sending, by the network manager, a response to the request to indicate that the route table is associated with the gateway for the substrate network.

9. The method of claim 7, wherein the gateway is a private gateway.

10. The method of claim 5, wherein the method further comprises determining that the request to associate the table is valid before causing the update to the edge router.

11. The method of claim 5, wherein the method further comprises forwarding, by the edge router, network traffic to the overlay network that is sent from the client device and directed to the overlay network according to the network route.

12. The method of claim 5, further comprising:
receiving, by the network manager, a request to delete the network route from a route table for the overlay network; and
responsive to receiving the request to delete the network route from the route table for the overlay network, causing another update to the edge router to remove the default route.

13. The method of claim 5, wherein the client device is implemented as part of a client network external to the provider network, and wherein the edge router provides a dedicated physical connection between a client router and the edge router for the dedicated physical connection.

14. A non-transitory, computer-readable storage medium, storing program instructions that when executed by one or more computing devices cause the one or more computing devices to implement a network manager for a substrate network that implements:
receiving a request to associate a route table of an overlay network that is implemented over the substrate network with a gateway for the substrate network to make the overlay network accessible to a client device external to the substrate network;
responsive to the request, causing an update to an edge router for the substrate network to add a network route of the route table for the overlay network as a default route in order to correctly route network traffic received at the edge router that is directed to the overlay network when a destination address of the network traffic is not recognized at the edge router; and
sending, by the network manager, an indication that the route table is associated with the gateway for the substrate network.

15. The non-transitory, computer-readable storage medium of claim 14, wherein the gateway is a public gateway.

16. The non-transitory, computer-readable storage medium of claim 14, wherein the program instructions further cause the network manager to implement:

receiving a request to disassociate the route table from the gateway; and responsive to the request to disassociate the route table from the gateway, causing another update to the edge router for the substrate network to remove the default route.

17. The non-transitory, computer-readable storage medium of claim 14, wherein the program instructions further cause the network manager to implement creating the route table for the overlay network.

18. The non-transitory, computer-readable storage medium of claim 17, wherein the program instructions further cause the network manager to implement adding the network route to the route table responsive to a request to add the route table.

19. The non-transitory, computer-readable storage medium of claim 14, wherein the program instructions further cause the network manager to implement determining that the request to associate the table is valid before causing the update to the edge router.

20. The non-transitory, computer-readable storage medium of claim 14, wherein the substrate network is a logically isolated portion of a provider network that includes one or more service resources within the overlay network, wherein the edge router is an edge router for the logically isolated network, wherein the client device is implemented as part of a client network external to the provider network, wherein the gateway is a private gateway that receives the network traffic from an edge router that provides a dedicated physical connection between a client router and the edge router for the dedicated physical connection, and wherein the edge router for the dedicated physical connection is updated to add the network route of the route table of the overlay network.

* * * * *